United States Patent
Gonzalez et al.

(10) Patent No.: US 12,011,762 B2
(45) Date of Patent: Jun. 18, 2024

(54) NUT HAVING A SLOT FOR A SELECTIVE ADDITIVE MANUFACTURING APPARATUS

(71) Applicant: AddUp, Cebazat (FR)

(72) Inventors: Antonio Gonzalez, Cebazat (FR); Denis Sepret, Cebazat (FR)

(73) Assignee: AddUp, Cebazat (FR)

( * ) Notice: Subject to any disclaimer, the term of this patent is extended or adjusted under 35 U.S.C. 154(b) by 382 days.

(21) Appl. No.: 17/311,603

(22) PCT Filed: Dec. 6, 2019

(86) PCT No.: PCT/EP2019/083959
§ 371 (c)(1),
(2) Date: Jun. 7, 2021

(87) PCT Pub. No.: WO2020/115271
PCT Pub. Date: Jun. 11, 2020

(65) Prior Publication Data
US 2022/0018383 A1     Jan. 20, 2022

(30) Foreign Application Priority Data

Dec. 7, 2018   (FR) ...................................... 1872547

(51) Int. Cl.
| | |
|---|---|
| *F16H 25/20* | (2006.01) |
| *B22F 10/28* | (2021.01) |
| *B22F 12/00* | (2021.01) |
| *B22F 12/50* | (2021.01) |
| *B33Y 30/00* | (2015.01) |

(Continued)

(52) U.S. Cl.
CPC .............. *B22F 12/50* (2021.01); *B22F 10/28* (2021.01); *B22F 12/224* (2021.01); *B33Y 30/00* (2014.12); *F16B 37/0828* (2013.01); *F16H 25/20* (2013.01); *B22F 12/53* (2021.01); *B33Y 10/00* (2014.12); *F16B 33/002* (2013.01)

(58) Field of Classification Search
CPC ........ B22F 12/50; B22F 12/53; B22F 12/224; B22F 10/28; B33Y 30/00; B33Y 10/00; F16B 37/0828
See application file for complete search history.

(56) References Cited

U.S. PATENT DOCUMENTS 6,146,076 A * 11/2000 Bodin ................. F16B 37/0828
                                                                211/187
2007/0126157 A1   6/2007 Bredt

FOREIGN PATENT DOCUMENTS

| CN | 204504219 U | 7/2015 |
| CN | 105856568 A | 8/2016 |

(Continued)

OTHER PUBLICATIONS

International Search Report dated Feb. 4, 2020, in corresponding PCT/EP2019/083959 (4 pages).

*Primary Examiner* — Randell J Krug
(74) *Attorney, Agent, or Firm* — VENABLE LLP

(57) ABSTRACT

Nut (1) for moving a strip for transporting powder in a selective additive manufacturing apparatus, having a tapped hole (2) extending along a first axis (A), characterized in that it comprises a slot (3a, 3b) which passes through the thickness of the nut from an external surface of the nut (1) to the internal surface (5) of the tapped hole (2) and which extends along a plane passing through the first axis (A) over at least one thread pitch (6) of the tapped hole (2).

12 Claims, 4 Drawing Sheets

(51) Int. Cl.
*F16B 37/08* (2006.01)
*B22F 12/53* (2021.01)
*B33Y 10/00* (2015.01)
*F16B 33/00* (2006.01)

(56) References Cited

FOREIGN PATENT DOCUMENTS

| | | | | | |
|---|---|---|---|---|---|
| CN | 105864251 A | * | 8/2016 | | |
| GB | 2054787 A | * | 2/1981 | ............. | F16B 37/00 |
| KR | 10-2015-0016892 A | | 2/2015 | | |

* cited by examiner

NUT HAVING A SLOT FOR A SELECTIVE ADDITIVE MANUFACTURING APPARATUS

OVERALL TECHNICAL FIELD AND PRIOR ART

The present invention relates to the general field of selective additive manufacturing.

Selective additive manufacturing consists in creating three-dimensional objects by consolidating selected zones in successive layers of pulverulent material (metal powder, ceramic powder, etc.). The consolidated zones correspond to successive cross sections of the three-dimensional object. Consolidation takes place for example layer by layer, through total or partial selective melting carried out using a power source.

The pulverulent material or powder can be transported from the powder reservoir to the manufacturing zone using a strip designed to slide within a slide.

Some of the powder may pass in suspension into the surrounding atmosphere, and so the working environment may be harmful to mechanical components of the apparatus. This is the case in particular for the components involved in the transmission of a movement, such as the movement of the strip within the slide.

The use of a screw-nut system for setting the strip in motion is known from the prior art. The gaps between the screw and the nut are obstructed by the material in suspension in the environment. These deposits of powder reduce and then eliminate the mechanical play in the screw-nut system. Frequent changing of components is necessary.

Therefore, there is a need for a system for setting the strip in motion that exhibits a longer service life when it operates in an environment containing a material powder in suspension.

GENERAL SUMMARY OF THE INVENTION

An overall aim of the invention is to overcome the limitations of the prior art.

In particular, the aim is to propose a system for setting a strip in motion which exhibits a longer service life when it operates in an environment containing a material powder in suspension.

To this end in particular, the invention proposes a nut for moving a strip for transporting powder in a selective additive manufacturing apparatus, having a tapped hole extending along a first axis, characterized in that it comprises a slot which passes through the thickness of the nut from an external surface of the nut to the internal surface of the tapped hole and which extends along a plane passing through the first axis over at least one thread pitch of the tapped hole.

Such a nut is advantageously supplemented by the following various features considered on their own or in combination:
  the slot extends along the first axis from an end of the nut perpendicular to the first axis;
  two slots each extend along the first axis from one end of the nut;
  the slot has a width along a third axis perpendicular to the first axis and to the second axis at least three times greater than a maximum size of grains in suspension in the operating environment;
  the slot has a width along the third axis of between 500 micrometres and 10 000 micrometres;
  the slot has a width along the third axis of between 1000 micrometres and 2000 micrometres;
  the external surface of the nut is a cylinder extending along the first axis;
  the external surface of the nut is a cylinder that also has two grooves extending along the first axis, each groove being formed by a first rectangular surface parallel to the second axis and by a second rectangular surface parallel to the third axis, the two grooves being positioned in a zone diametrically opposite the slot.

The invention also relates to a system for setting in motion a strip for a selective additive manufacturing apparatus comprising a nut as described above, a strip to which the nut is fixed such that the nut is prevented from rotating with respect to the strip, the system for setting in motion also comprising a screw comprising a thread engaged in the tapped hole of the nut, the slot in the nut being situated in the zone diametrically opposite the strip with respect to the first axis.

Such a system for setting in motion is advantageously supplemented by the following various features considered on their own or in combination:
  a pin designed to be housed in the slot of the nut so as to prevent the nut from rotating about the first axis with respect to the strip;
  the strip comprises, in its lower part, a recess designed to receive the part of the nut situated between the two grooves;
  a half-shell designed to be rigidly fixed to the strip and to enclose the nut with enough mechanical play to allow self-adjustment of the nut when said nut is fitted on the screw.

The invention also relates to an apparatus for the selective additive manufacturing of a three-dimensional object, having a system for setting in motion as has just been described, and to the use of such an apparatus, the additive manufacturing being carried out on the basis of an additive manufacturing powder, the slot having a width along a third axis perpendicular to the first axis and to the second axis at least three times greater than a maximum grain size of the additive manufacturing powder.

PRESENTATION OF THE FIGURES

Further features and advantages of the invention will become more apparent from the following description, which is purely illustrative and non-limiting and should be read in conjunction with the appended figures, in which.

DESCRIPTION OF ONE OR MORE IMPLEMENTATIONS AND EMBODIMENTS

System for Setting a Strip in Motion

Figure 1:
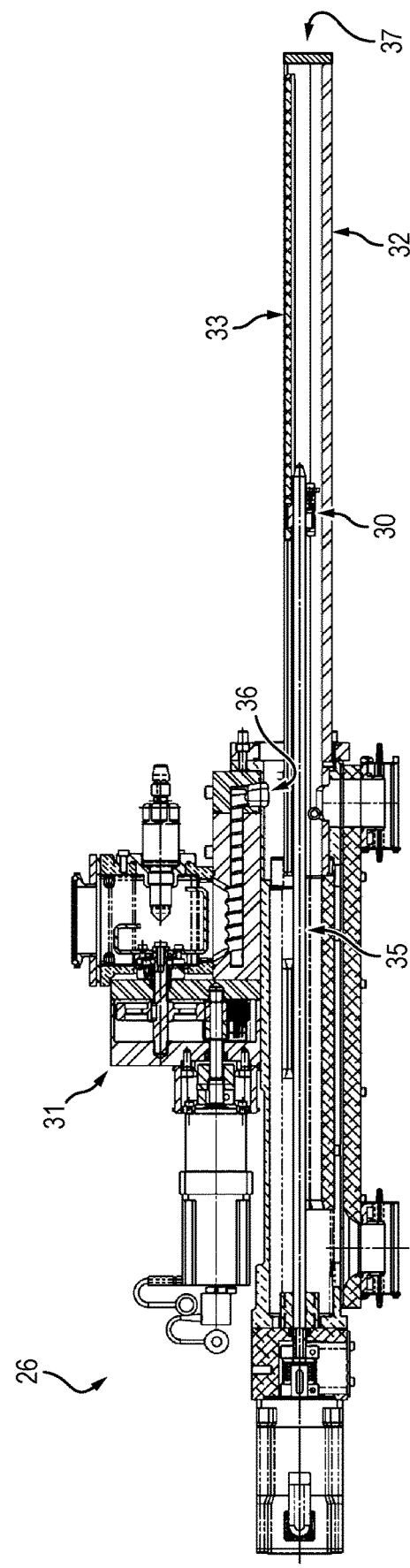
FIG. 1 is a schematic depiction of an example of a system for distributing pulverulent material in an additive manufacturing apparatus.

FIG. 1 shows an example of a system 26 for setting a strip 33 in motion.

The system 26 comprises a metering device 31 made to dispense an amount of powder through a nozzle 36.

A strip 33 can move within a slide 32 under the effect of a screw 35. The strip 33 is made to move in translation in the direction of the screw 35. The rotation of the screw 35 drives the movement in translation of the strip 33 within the slide 32 by virtue of a system 30 for setting the strip in motion, which comprises in particular a nut.

The slide 32 is situated close to the manufacturing zone and extends between the metering device 31 and an end 37 that limits the travel in translation of the strip.

During a loading phase, the strip 33 is moved under the nozzle 36. While the nozzle 36 delivers an amount of powder, the strip 33 is moved in the direction of the end 37 such that a layer of powder is deposited on the strip 33.

When the powder has been deposited on the whole strip 33 provided for this purpose, the strip is moved into abutment against the end 37. In this position, the layer of powder covering the strip 33 faces the manufacturing zone and the object being manufactured and can be spread over the last produced layer of the object.

Nut for a Selective Additive Manufacturing Apparatus

FIGS. 2A, 2B, 2C, 2D show different views of a nut for a selective additive manufacturing apparatus.

The nut 1 has a tapped hole 2 that extends along a first axis A. FIG. 2A shows a view of an end 7a of the nut 1 perpendicular to the axis A.

A second axis B perpendicular to the first axis A is shown in FIG. 2A, as is a third axis C perpendicular to the second axis B and to the first axis A.

The two arrows D in FIG. 2A indicate a cross section through the nut 1 along the second axis B. This cross section is shown in FIG. 2B.

Figure 2B:
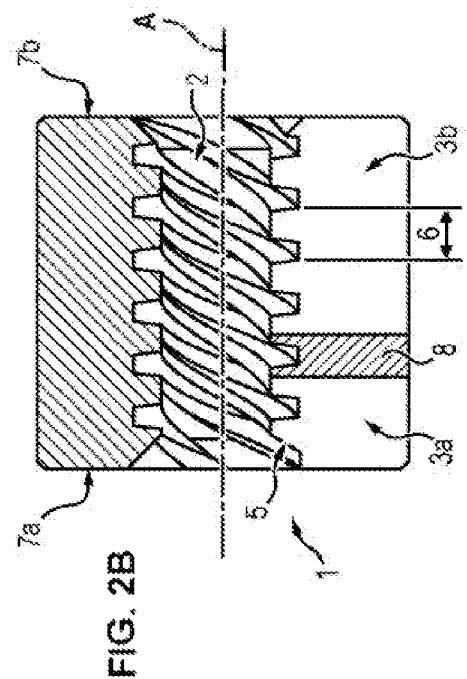
FIGS. 2A, 2B, 2C, 2D show different views of a nut for a selective additive manufacturing apparatus according to one aspect of the invention.

FIG. 2B shows the first axis A and the tapped hole 2, the thread of which has been shown. The distance 6 between two successive points in the thread represents the thread pitch 6.

The external surface 4 of the nut 1 is the surface of the nut 1 that is radially on the outside with respect to the first axis A.

The internal surface 5 of the nut 1 is the surface of the nut 1 that is radially on the inside with respect to the first axis A, and corresponds to the surface defined by the thread of the tapped hole.

The nut 1 comprises a slot 3a, 3b which extends along the first axis A over at least one thread pitch 6 of the tapped hole 2, the slot passing through the nut along the second axis B from the external surface 4 to the internal surface 5 of the nut 1, defined by the tapped hole 2.

The slot 3a, 3b places the interior space of the tapped hole 2 and the exterior space of the nut 1 in communication, in the direction of the second axis B.

It is possible, within the additive manufacturing apparatus, to dispose the nut 1 on a screw 35 such that the slot 3a, 3b is situated in a vertical plane towards the bottom of the nut 1. Deposits of pulverulent material, that is to say grains of powder that obstruct the gaps between the screw 35 and the nut 1, can be entrained along the surface 5 towards the slot 3a, 3b. The deposits can then fall under gravity into the slot 3a, 3b and leave the gaps. This reduces the phenomenon of the reduction and elimination of the mechanical play in the screw-nut system. This increases the service life of the screw-nut system in an environment containing additive manufacturing powder in suspension.

The slot 3a, 3b may advantageously not extend along the entire length of the thread of the nut so as not to prevent a part of the rotational energy of the screw from being converted into translational energy of the nut.

The length of the nut 1 along the first axis A along which the slot does not extend should be large enough for the screw fitted in the tapped hole 2 not to deform or open the nut 1 any further and also large enough to ensure the conversion of rotational energy of the screw into translational energy of the nut.

The tapped hole 2 may comprise one or more flights. In any case, the slot 3a, 3b extends along the first axis A over at least one thread pitch 6 of each flight of the tapped hole 2. This makes it possible to ensure that all the trajectories of the grains of powder that obstruct the gaps between the screw and the nut and are entrained along the surface 5 pass through the slot 3a, 3b.

FIG. 2B shows the end 7a of the nut 1 and an end 7b at the opposite end therefrom. The distance between the two ends 7a, 7b corresponds to the length of the tapped hole 2 and of the nut 1.

The slot 3a, 3b in the nut 1 may advantageously extend along the first axis A from the end 7a or from the end 7b of the nut 1. The ends 7a and 7b are both flat surfaces perpendicular to the first axis A.

In this situation, the slot 3a, 3b is apparent at the end 7a or the end 7b. The slot 3a, 3b places the interior space of the tapped hole 2 in communication with the exterior space of the nut 1 in the direction of the second axis B, but also in oblique directions in the section plane in FIG. 2B.

This makes it possible to increase the number of deposits that can fall under gravity into the slot 3a, 3b if the nut 1 is disposed within the additive manufacturing apparatus such that the slot 3a, 3b is situated in a vertical plane towards the floor or the bottom of the additive manufacturing apparatus. The angles at which the deposits can be discharged towards the outside are more numerous in this situation.

The nut may advantageously comprise two slots 3a, 3b which each extend along the first axis A from one end 7a, 7b of the nut 1.

In the situation in which the nut 1 is disposed within the additive manufacturing apparatus to discharge deposits of powder that have built up in the gaps, the presence of two slots increases the area of the screw from which the deposits can be discharged. The number of deposits discharged is thus increased.

Such a nut is shown in FIG. 2B, in which two slots 3a and 3b are shown. Between these slots, a thickness of material 8 of the nut remains. This thickness 8 needs to be large enough for the screw fitted in the tapped hole 2 not to deform or open the nut 1 any further and also large enough for part of the rotational energy of the screw to be converted into translational energy of the nut 1.

Figure 2D:
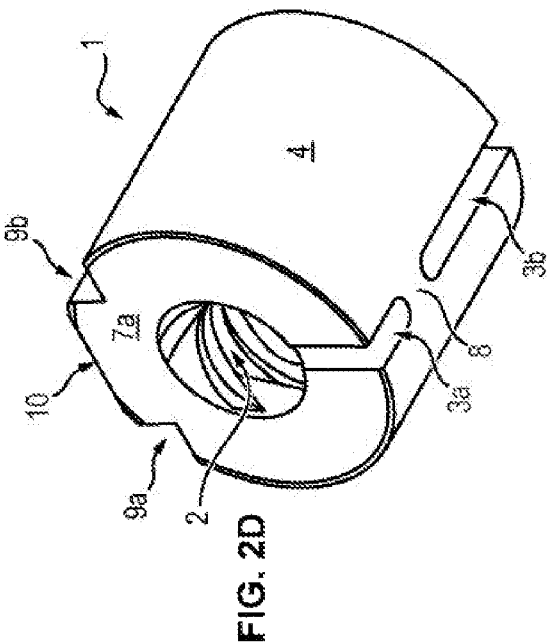
Figure 2A:
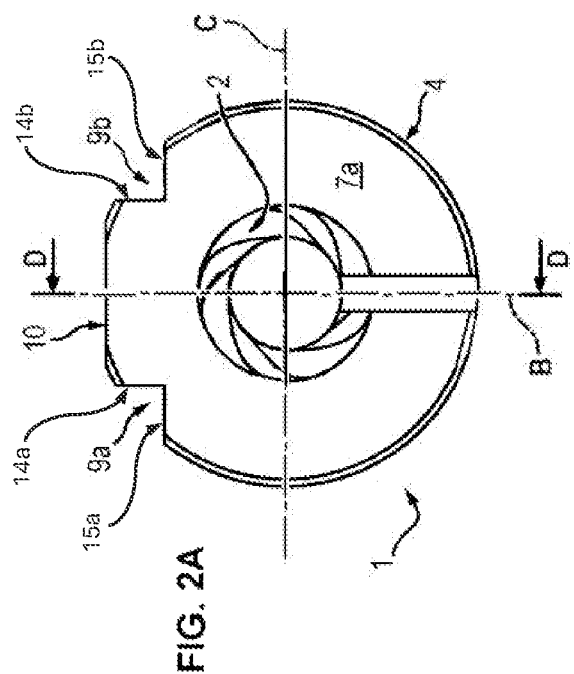
Figure 2C:
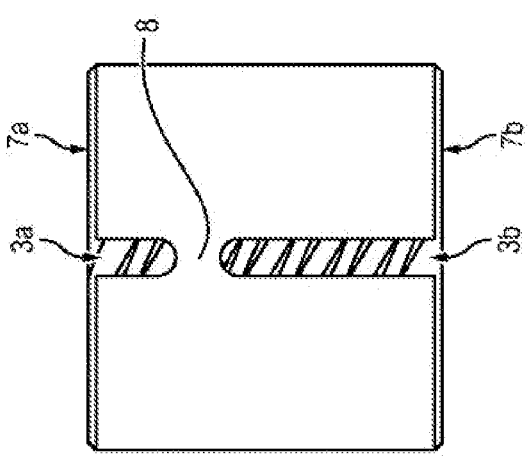

FIG. 2C shows a bottom view of the nut 1 along the second axis B from the side of the two slots 3a, 3b and the thickness of the material 8. The slot 3a is shown as extending from the end 7a, and the slot 3b is shown as extending from the end 7b.

FIG. 2D shows a perspective view of the nut 1 constructed from the views in FIGS. 2A and 2C.

The slot 3a, 3b has a width along the third axis C that can be adapted to the characteristics of the powder present in suspension in the operating environment.

Typically, the size of the grains of powder that are in suspension in the environment of the additive manufacturing apparatus and therefore in the environment of the nut is between 0 and 200 micrometres.

It is possible to design the slot 3a, 3b such that the width along the third axis C is three times greater than a maximum diameter of the grains of powder. In this way, three grains present in the slot cannot get stuck in the direction of the third axis C. Even more so, two grains present in the slot also cannot get stuck in the direction of the third axis C either. This feature makes it possible to decrease the probability of the slot being obstructed by the grains of powder and to increase the capability of the nut 1 to discharge the grains of powder that have built up in the screw-nut gaps. The width along the third axis C may thus be chosen to be greater than 600 micrometres.

The width along the third axis C may also be chosen to be equal to a value of between 500 micrometres and 10 000 micrometers, and advantageously to a value of between 1000 micrometres and 2000 micrometres.

The nut 1 may have a cylindrical shape, and in this case the external surface 4 corresponds exactly to a cylinder that extends along the first axis A.

The nut 1 may have some other shape. For example, a cylindrical shape extending along the first axis A and having two grooves 9a, 9b that also extend along the first axis A. Each groove 9a, 9b defines a first rectangular surface 14a, 14b parallel to the second axis B and a second rectangular surface 15a, 15b parallel to the third axis C. The two grooves are positioned in a zone diametrically opposite the slot 3a, 3b. FIGS. 2A and 2D show the two grooves 9a and 9b.

Thus defined, the shape of the external surface 4 has a part 10 situated between the two grooves 9a, 9b that protrudes from the rest of the external surface 4. This part may for example be inserted into a housing in the strip that is situated under the strip. In this way, the nut takes up and maintains a position in which the slot 3a, 3b is directed in a vertical plane towards the floor and the bottom of the additive manufacturing apparatus. Furthermore, this shape defining a smaller volume of the nut 1 allows the nut to be mounted and removed more easily within the additive manufacturing apparatus.

System for Setting a Strip in Motion

Figure 3:
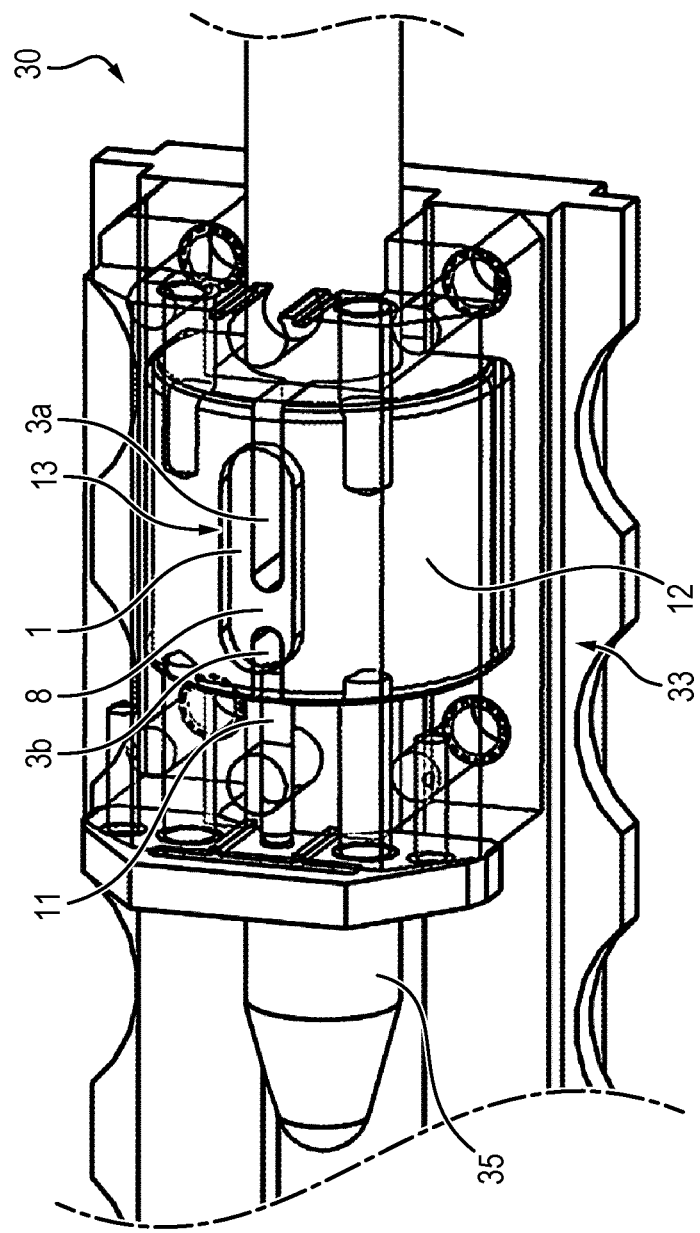
FIG. 3 is a schematic depiction of an example of a system for setting in motion a strip for a selective additive manufacturing apparatus according to one aspect of the invention.

FIG. 3 is a schematic depiction of an example of a system for setting in motion a strip for a selective additive manufacturing apparatus.

The system 30 for setting in motion comprises the strip 33 and a nut 1 as described above. The nut is fixed to the strip such that the nut is prevented from rotating with respect to the strip.

The system 30 for setting in motion also comprises a screw, the thread of which is engaged in the tapped hole 2 of the nut 1.

The system is designed such that the slot 3a, 3b in the nut is situated in the zone diametrically opposite the strip 33 with respect to the axis of the screw 35.

It is necessary to prevent the nut from rotating with respect to the strip in order for the movement in translation of the strip to be controlled by the rotation of the screw. Such rotation prevention also allows the position of the slot 3a, 3b to always be kept in the same zone. It is therefore possible to keep the slot 3a, 3b in a vertical plane towards the floor and the bottom of the additive manufacturing apparatus throughout the operation of the additive manufacturing apparatus.

One possibility for preventing the nut from rotating with respect to the strip is to use a pin 11 designed to be housed in the slot 3a, 3b in the nut 1. One end of the pin is thus engaged in the slot 3a, 3b in the direction of the first axis A. The pin may be chosen to be long enough for the other end to protrude from the slot 3a, 3b and to be able to be housed in a hole in the strip 33 or in a component rigidly fixed to the strip 33.

The use of a cylindrical pin, the diameter of which is less than the width of the slot in the direction of the third axis C, makes it possible to have mechanical play between the nut 1 and the pin. This allows easier assembly and disassembly of the structure, while ensuring that the nut 1 is prevented from rotating.

Another possibility for preventing the nut from rotating is to position that part 10 of the nut 1 situated between the two grooves 9a, 9b in a recess in the strip. In this way, the part 10 comes into abutment against the recess, thereby preventing the nut from rotating about the axis A with respect to the strip.

Such a recess makes it possible to easily position the nut 1 in the position for discharging deposits of powder. Furthermore, it is possible to allow mechanical play by choosing a recess that is slightly wider than the part 10 of the nut 1 situated between the two grooves 9a, 9b. This makes it possible to fix an angular position of the nut 1 with respect to the strip 33 without imposing a strict position in the directions of the first axis A and of the second axis B.

The nut is enclosed by a half-shell 12 which is rigidly fixed to the strip 33. The dimensions of the interior of the half-shell 12 are slightly larger than the dimensions of the exterior of the nut 1 and designed for there to be mechanical play between the nut and the half-shell. The mechanical play is sufficient to allow self-alignment of the nut on the screw 35.

In this way, the nut is mounted in a floating manner and the service life of the flights of the nut is increased.

The dimensions of the interior of the half-shell 12 are slightly larger than the dimensions of the exterior of the nut 1 in all directions. In particular, along the first axis A, there is translational mechanical play of the nut with respect to the half-shell. When the nut is moved in one direction of the first axis A, it comes, at the end of travel allowed by this translational mechanical play, into abutment against the half-shell and the nut is then prevented from moving. This allows the strip 33 to be set in motion.

The half-shell 12 comprises a cutout 13 designed to be situated opposite the slot 3a, 3b in the nut 1. This allow the deposits of grains that have fallen from the slots 3a, 3b to continue falling towards the floor and the bottom of the additive manufacturing apparatus.

Selective Additive Manufacturing Apparatus

Figure 4:
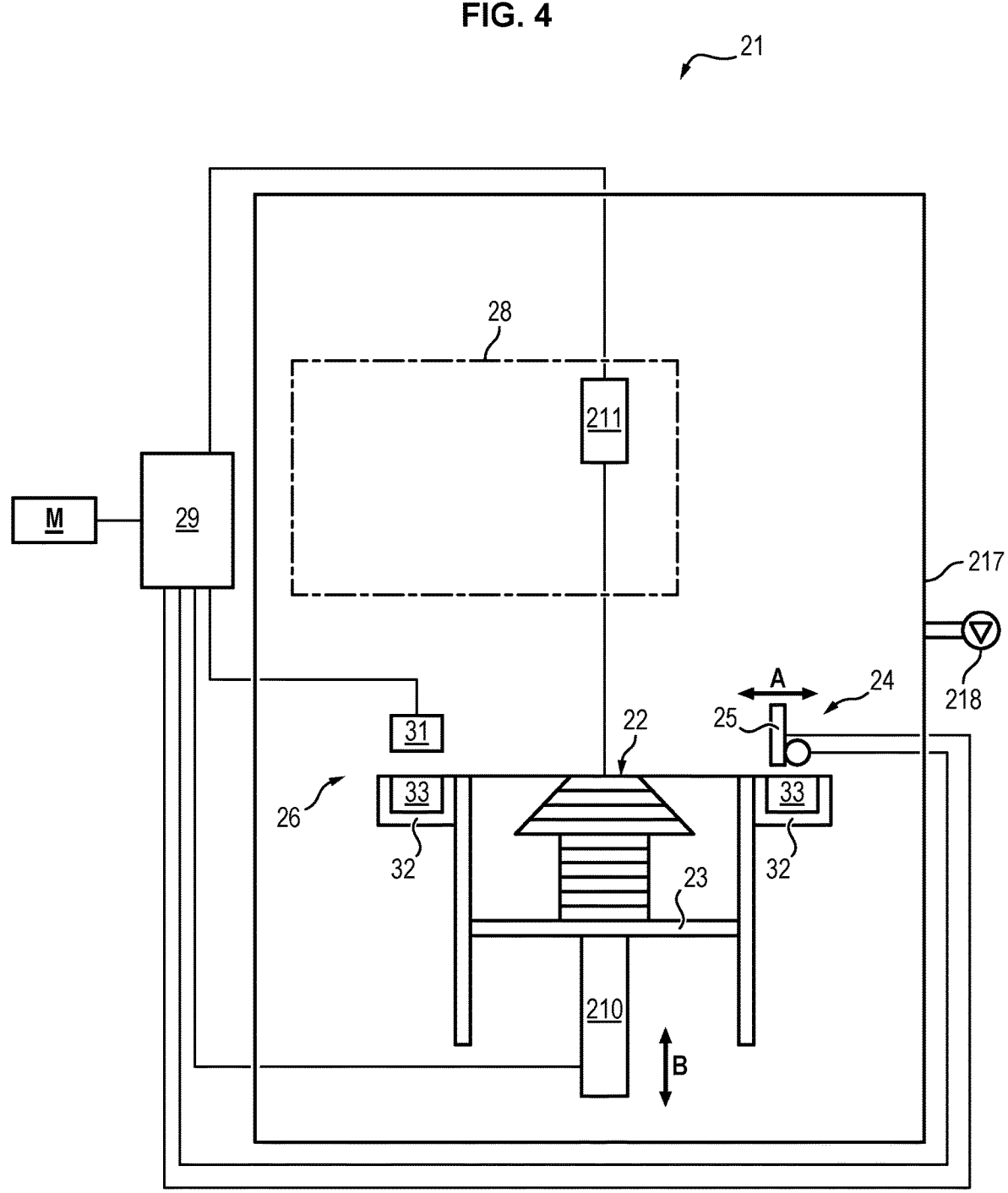
FIG. 4 is a schematic depiction of an additive manufacturing apparatus having a system for setting a strip in motion according to one possible embodiment of the invention.

The selective additive manufacturing apparatus 21 in FIG. 4 comprises:
- a support such as a horizontal plate 23 on which the various layers of additive manufacturing powder (metal powder, ceramic powder, etc.) are successively deposited, allowing a three-dimensional object to be manufactured (object 22 in the shape of a fir tree in the figure),
- a system 26 for distributing pulverulent material, designed to provide manufacturing powder at the layering roller or spreader. The distribution system 26 comprises a metering device 31, a slide 32 and a strip 33.
- an arrangement 24 for the distribution of said metal powder over the plate, this arrangement 24 having for example a layering roller and/or spreader 25 for spreading the various successive layers of powder (movement along the double-headed arrow A),
- an assembly 28 having a power source 211, for example a laser beam and/or electron beam, for the (total or partial) melting of the spread fine layers, the energy generated by the power source 211 coming into contact with the spread fine layers in the powder plane.

a control unit 29 which controls the various components of the apparatus 21 depending on pre-stored information (memory M), a mechanism 210 for allowing the support for the plate 23 to descend as the layers are deposited (movement along the double-headed arrow B).

The components of the apparatus 21 are arranged within a sealed chamber 217 that can be connected to an inert gas circuit and/or to at least one vacuum pump 218 if an electron beam is used.

The invention claimed is:

1. A nut for moving a strip for transporting powder in a selective additive manufacturing apparatus, the nut comprising:
    a tapped hole extending along a first axis; and
    a slot which passes through a thickness of the nut from an external surface of the nut to an internal surface of the tapped hole and which extends along a plane passing through the first axis over at least one thread pitch of the tapped hole,
    wherein the external surface of the nut is a cylinder that comprises two grooves extending along the first axis, each groove being formed by a first rectangular surface parallel to a second axis and by a second rectangular surface parallel to a third axis, the two grooves being positioned in a zone diametrically opposite the slot.

2. The nut according to claim 1, wherein the slot extends along the first axis from an end of the nut, the end extending perpendicularly to the first axis.

3. The nut according to claim 1, comprising two slots, each slot extending along the first axis from one end of the nut.

4. The nut according to claim 1, wherein the slot has a width along a third axis perpendicular to the first axis and to a second axis at least three times greater than a maximum size of grains in suspension in an operating environment surrounding the nut.

5. The nut according to claim 1, wherein the slot has a width along a third axis perpendicular to the first axis and to a second axis of between 500 micrometers and 10,000 micrometers.

6. The nut according to claim 1, wherein the slot has a width along a third axis perpendicular to the first axis and to a second axis of between 1,000 micrometers and 2,000 micrometers.

7. A system for setting in motion a strip for a selective additive manufacturing apparatus comprising:
    a nut for moving a strip for transporting powder in a selective additive manufacturing apparatus, the nut comprising:
        a tapped hole extending along a first axis; and
        a slot which passes through a thickness of the nut from an external surface of the nut to an internal surface of the tapped hole and which extends along a plane passing through the first axis over at least one thread pitch of the tapped hole;
    a strip to which the nut is fixed such that the nut is prevented from rotating with respect to the strip; and
    a screw comprising a thread engaged in the tapped hole of the nut,
    wherein the slot in the nut is situated in a zone diametrically opposite the strip with respect to the first axis.

8. The system according to claim 7, further comprising a pin configured to be housed in the slot of the nut so as to prevent the nut from rotating about the first axis with respect to the strip.

9. The system according to claim 7, wherein the strip comprises a lower part, the lower part comprising a recess configured to receive a part of the nut situated between the two grooves.

10. The system according to claim 7, further comprising a half-shell configured to be rigidly fixed to the strip and to enclose the nut with mechanical play sufficient to allow self-adjustment of the nut when the nut is fitted on the screw.

11. A selective additive manufacturing apparatus having the system according to claim 7.

12. A method of additive manufacturing using an additive manufacturing powder, the method comprising the step of:
    using the selective additive manufacturing apparatus according to claim 11,
    wherein the slot has a width along a third axis perpendicular to the first axis and to a second axis at least three times greater than a maximum grain size of the additive manufacturing powder.

* * * * *